(12) United States Patent
Kionoshita

(10) Patent No.: US 6,186,506 B1
(45) Date of Patent: Feb. 13, 2001

(54) METHOD FOR SEALING TWO MEMBERS AND GASKET THEREFOR

(75) Inventor: Yuichi Kionoshita, Utsunomiya (JP)

(73) Assignee: Ishikawa Gasket Co., Ltd., Tokyo (JP)

( * ) Notice: Under 35 U.S.C. 154(b), the term of this patent shall be extended for 0 days.

(21) Appl. No.: 09/177,654

(22) Filed: Oct. 23, 1998

(30) Foreign Application Priority Data

Nov. 11, 1997 (JP) .................................................. 9-325332

(51) Int. Cl.$^7$ .................................................. F02F 11/00
(52) U.S. Cl. .................. 277/313; 277/316; 277/592; 277/594; 277/598; 277/931
(58) Field of Search .................. 277/592, 594, 277/598, 313, 931, 601, 627, 641, 652, 650, 316

(56) References Cited

U.S. PATENT DOCUMENTS

| | | | |
|---|---|---|---|
| 1,903,990 | * 4/1933 | Fitzgerald | 277/594 |
| 3,586,338 | * 6/1971 | Mikiau | 277/591 |
| 3,864,181 | * 2/1975 | Wolinski et al. | 156/79 |
| 4,243,231 | * 1/1981 | Sugawara | 277/592 |
| 4,307,127 | * 12/1981 | Shah | 427/27 |
| 4,756,561 | 7/1988 | Kawata et al. . | |
| 5,267,740 | * 12/1993 | Stritzke | 277/591 |
| 5,297,806 | * 3/1994 | Kestly | 277/591 |
| 5,407,214 | 4/1995 | Lew et al. . | |
| 5,408,963 | * 4/1995 | Miyaoh et al. | 123/193.3 |
| 5,951,021 | * 9/1999 | Ueta | 277/593 |

FOREIGN PATENT DOCUMENTS

| | | |
|---|---|---|
| 41 13 817 | 11/1991 | (DE) . |
| 0 713 988 | 5/1996 | (EP) . |
| 2 291 938 | 2/1996 | (GB) . |

* cited by examiner

*Primary Examiner*—Anthony Knight
*Assistant Examiner*—Alison K. Pickard
(74) *Attorney, Agent, or Firm*—Kanesaka & Takeuchi

(57) ABSTRACT

A gasket is formed of a gasket body having at least one hole to be sealed, and a sealing space situated around at least a part of the hole. A heat foamable coating is disposed only in the sealing space. The gasket is installed between two members, and then, the gasket is heated to foam the foamable coating in the sealing space. Thus, the foamable coating provides a surface pressure in the sealing space by foaming to securely seal thereat.

8 Claims, 3 Drawing Sheets

METHOD FOR SEALING TWO MEMBERS AND GASKET THEREFOR

BACKGROUND OF THE INVENTION AND RELATED ART STATEMENT

The present invention relates to a method for sealing two members and a gasket therefor, in particular, to a method of sealing two engine parts, such as a cylinder head and a cylinder block, and a gasket used for sealing the engine parts.

In sealing two engine parts, such as a cylinder head and a cylinder block for an internal combustion engine, a gasket is generally installed between the two parts. In order to securely seal around a hole to be sealed, such as cylinder bores, water holes and oil holes, the gasket is provided with sealing means around the hole, such as a bead, flange or turning portion, grommet, combination thereof, and so on. When the gasket is tightened, the sealing means provides a surface pressure to securely seal around the hole.

In case the hole to be sealed has an enough space therearound for sealing, though some technical difficulties may be encountered depending on the structure thereof, the hole can be sealed relatively easily by the sealing means. However, if there is no sufficient space around the hole to be sealed, it is difficult to securely seal around the hole.

In case the sufficient sealing space is not obtained or additional sealing means is required, a coating layer containing rubber or resin may be formed on a gasket or between plates for the gasket. The coating layer prevents the fluid from flowing on the gasket or between the plates.

Also, it has been known that a foaming layer may be coated on an entire surface of a gasket. In this case, after the gasket is assembled and the foaming layer is foamed, the gasket with the foamed layer is installed between the engine parts. Therefore, when the gasket with the foamed layer is installed and tightened between the engine parts, the foamed layer may be compressed excessively to loose compressibility or resilience. Even if the foamed layer has compressibility when the gasket is installed between the engine parts, in case the gasket is used for a long time, the gasket is compressed repeatedly. Accordingly, the compressibility of the foamed layer is lost gradually.

The present invention has been made in view of the conventional gasket, and an object of the invention is to provide a gasket with a foamed layer which can provide an adequate surface pressure.

Another object of the invention is to provide a gasket with a foamed layer as stated above, wherein the surface pressure is not substantially lost even if it is used for a long time.

A further object of the invention is to provide a gasket with a foamed layer as stated above, wherein the gasket can provide a surface pressure even in a limited space.

A still further object of the invention is to provide a method for sealing between two members, wherein an adequate surface pressure is formed between the two members and is kept for a long time.

A still further object of the invention is to provide a method as stated above, wherein the adequate surface pressure is formed easily without special treatment.

Further objects and advantages of the invention will be apparent from the following description of the invention.

SUMMARY OF THE INVENTION

A gasket of the invention is used for sealing two parts or members, e.g. cylinder head and cylinder block for an internal combustion engine.

The gasket is formed of a gasket body for constituting the gasket, which includes at least one hole to be sealed, and a sealing space situated around at least a part of the hole. A heat foamable coating is disposed only in the sealing space. When the gasket is heated to foam the heat foamable coating in the sealing space after the gasket is installed between the two members, the heat foamable coating foams and provides a surface pressure in the sealing space to securely seal thereat.

In case the gasket body includes two holes to be sealed, flanges or shims may be formed around the two holes. In this case, the sealing space is established on the gasket body between the flanges or shims. In case the flange is not formed around the hole, a groove may be formed in the metal plate around the hole as the sealing space.

In a method for sealing the two members with holes, a gasket is prepared to have at least one hole to be sealed and a sealing space near the hole, and a heat foamable coating is provided only in the space. Then, the gasket with the heat foamable coating is mounted between the two members, and the heat foamable coating on the gasket is heated together with the gasket to foam the heat foamable coating. The heat foamable coating changes to a foamed layer to thereby provide a surface pressure at the sealing space.

Preferably, after the gasket is installed between the two members and before the heat foamable coating is heated, the gasket is tightened between the two members. Accordingly, when the foamable coating is foamed, the desired surface pressure or foaming pressure is obtained at the foamed layer. In this case, also, after the foamable coating is foamed, the foamed layer is not substantially compressed. Thus, the foamed layer is not depressed too much to reduce the thickness thereof, so that the reductions of the surface pressure and the thickness of the foamed layer are substantially avoided. Further, since the foamable coating can foam according to the shape of the space, the sealing ability can be increased.

In case the gasket is formed for an internal combustion engine, i.e. cylinder head gasket, the heating step may be performed by actuating the engine, such as running test, after the gasket is installed in the engine. In this case, since the heating step can be avoided in preparing the gasket, the gasket can be formed easily.

DETAILED DESCRIPTION OF PREFERRED EMBODIMENTS

Figure 1:
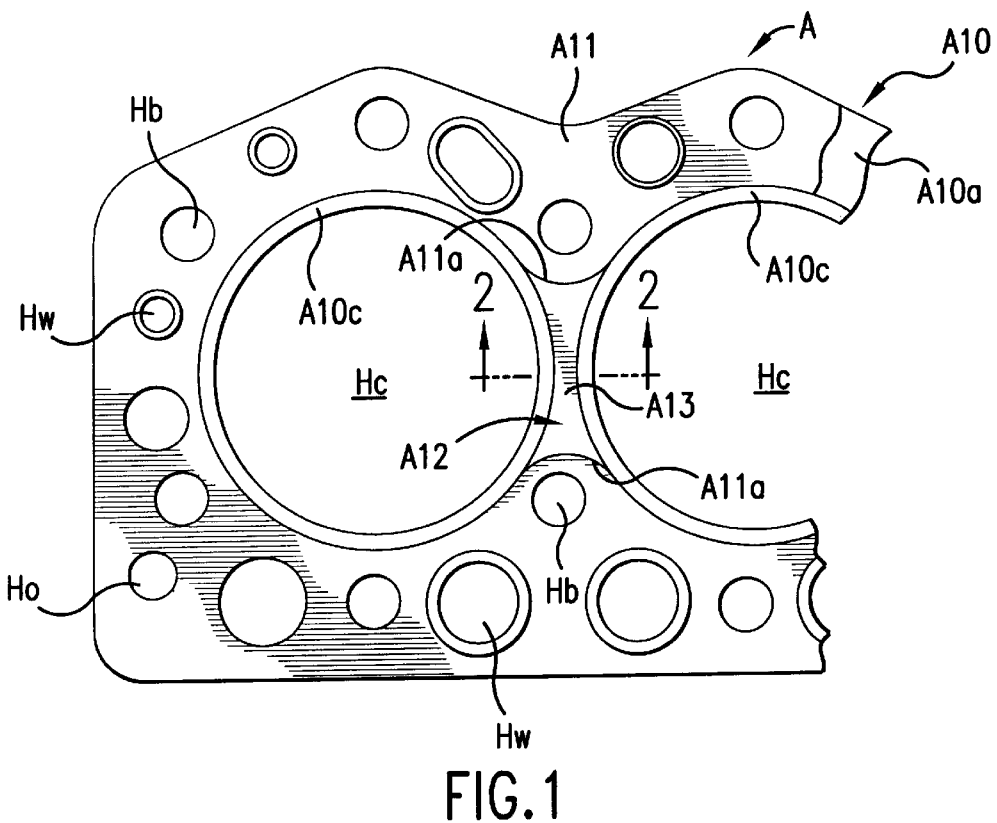
FIG. 1 is a partial plan view of a metal gasket of a first embodiment of the invention.
Figure 2:
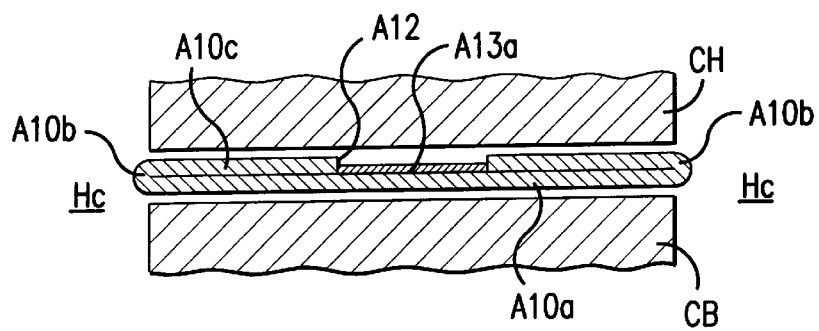
FIG. 2 is an enlarged sectional view taken along line 2—2 in FIG. 1, wherein the gasket is installed in an engine.
Figure 3:
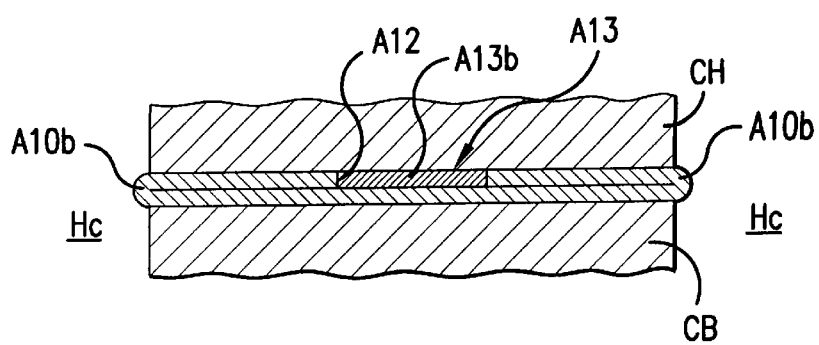
FIG. 3 is an enlarged sectional view, similar to FIG. 2, for showing the gasket of the first embodiment after a foamable coating is foamed.

With reference to FIGS. 1–3, a first embodiment A of a gasket of the invention is explained. The gasket A is a cylinder head gasket to be installed between a cylinder head CH and a cylinder block CB. The gasket A includes a plurality of cylinder bores Hc, water holes Hw, oil holes Ho, bolt holes Hb and so on, as in the conventional gasket. In this embodiment, the sealing structure formed around the cylinder bores Hc is explained. Therefore, the explanations for the structures of the water holes Hw, oil holes Ho and so on are omitted. Any structures known in the art can be utilized.

The gasket A is formed of a lower metal plate A10, and an upper metal plate A11 disposed on the lower metal plate A10. The lower metal plate A10 includes a base portion A10a, curved portions A10b extending from the base portion A10a to define the cylinder bores Hc, and flanges A10c extending from the curved portions A10b and disposed on the base portion A10a. A sealing space A12 is established between the flanges A10c situated adjacent to each other.

The upper plate A11 is disposed on the base portion A10a without overlapping the flanges A10c. In the upper plate A11, individual holes for the cylinder bores are not formed, and one hole communicating with the cylinder bores Hc is formed. Namely, in the upper plate A11, there is no portion located in the sealing space A12 on the lower plate A10. Thus, the sealing space A12 is established on the lower plate A10, which is surrounded by edges A11a of the upper plate A11 and the flanges A10c.

In the gasket A, the sealing space A12 between the flanges A10c is too narrow to form a sealing device, such as bead. Thus, a sealing member A13 is formed in the sealing space A12. The sealing member A13 is a foamed coating or layer A13b made from a foamable coating A13a.

In particular, when the gasket A is formed, the lower metal plate A10 and the upper metal plate A11 are assembled to have the sealing space A12 surrounded by the flanges A10c and the edges A11a, in which the foamable coating A13a is coated. The foamable coating A13a may be a diazo type foamable coating or paint, which is available in a market. The foamable coating does not foam at a temperature in assembling the gasket, such as heating the gasket for drying the foamable coating and other coating if applied, and is foamed at a temperature higher than the assembling temperature.

In particular, the foamable coating contains a foaming agent, such as azodicarbonamide (decomposition temperature: 200–210° C.); in a paint, such as rubber type paint. Microcapsules with heat expansion type containing hydrocarbon with a low boiling point, such as butane, may be used as the foaming agent. Dissolving temperature of the microcapsules may be selected between 140–200° C. The foaming rate is preferably 3–5 times.

The gasket A with the foamable coating A13a is situated between the cylinder head CH and the cylinder block CB, as shown in FIG. 2, and is tightened. Thereafter, the gasket A is heated to foam the foamable coating A13a, so that the foamable coating A13a is changed to the foamed layer A13b in the entire space A12, as shown in FIG. 3. The heat for foaming the foamable coating A13a may be obtained in operating the engine with the gasket A as a running test. In this case, no special heating step is actually required.

In the invention, after the gasket A is securely tightened between the cylinder head CH and the cylinder block CB by the bolts to provide the required tightening pressure, the foamable coating A13a is foamed. Thus, the surface pressure at the foamed layer A13b is substantially obtained by the foaming pressure. Namely, the foamed layer A13b is not excessively compressed by tightening the bolts, to thereby provide the ideal surface pressure at the sealing space A12.

Also, since the foamable coating A13a is foamed according to the shape of the sealing space A12, the sealing ability is improved.

Figure 4:
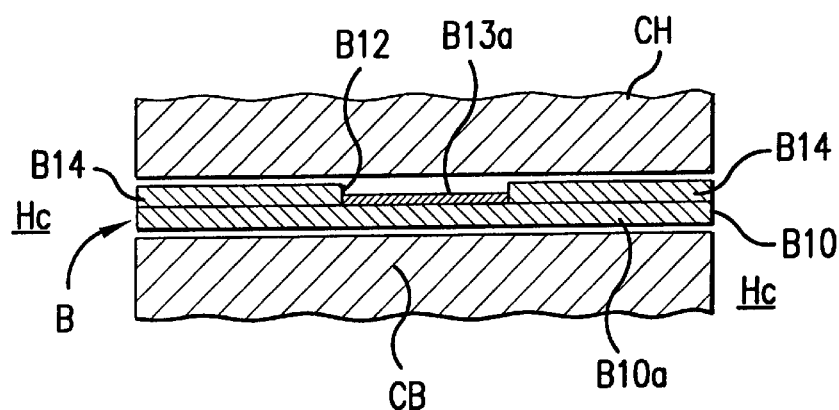
FIG. 4 is an enlarged sectional view, similar to FIG. 2, for showing a second embodiment of the invention.
Figure 5:
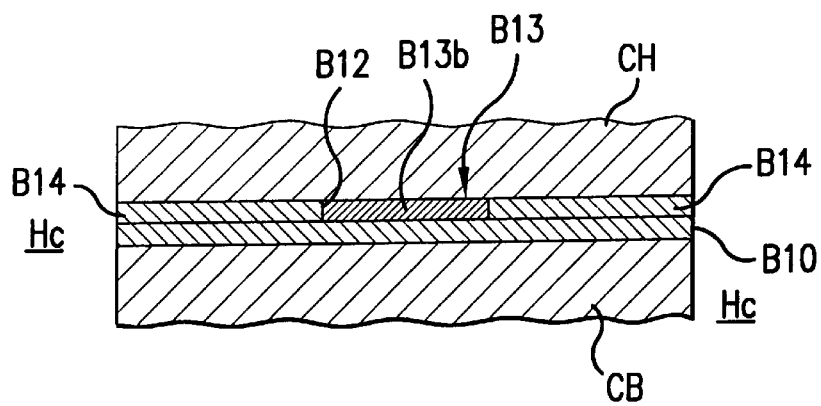
FIG. 5 is an enlarged sectional view, similar to FIG. 3, for showing the gasket of the second embodiment after the foamable coating is foamed.

FIGS. 4 and 5 show a second embodiment B of the gasket of the invention. In the gasket B, the basic structure is the same as the gasket A, but the flanges A10c with the curved portions A10b are not formed in a lower plate B10. Namely, the lower plate B10 has the same shape as in the base portion of the lower plate A10 without the flanges A10c and the curved portions A10b. In the gasket B, however, annular shims B14 are arranged around the cylinder bores Hc instead of the flanges A10c. Thus, a sealing space B12 is defined by the annular shims B14 and the edges of an upper plate (not shown), similar to the gasket A, and a foamable coating B13a same as the foamable coating A13a is applied in the sealing space B12.

The gasket B with the foamable coating B13a is installed between the cylinder head CH and the cylinder block CB and is tightened, and then, the engine is heated to foam the foamable coating B13a. Thus, the foamable coating B13a is changed to a foamed layer B13b as a sealing member B13, as shown in FIG. 5. The running test of the engine may constitute the heating of the gasket. The gasket B operates as in the gasket A.

Figure 6:
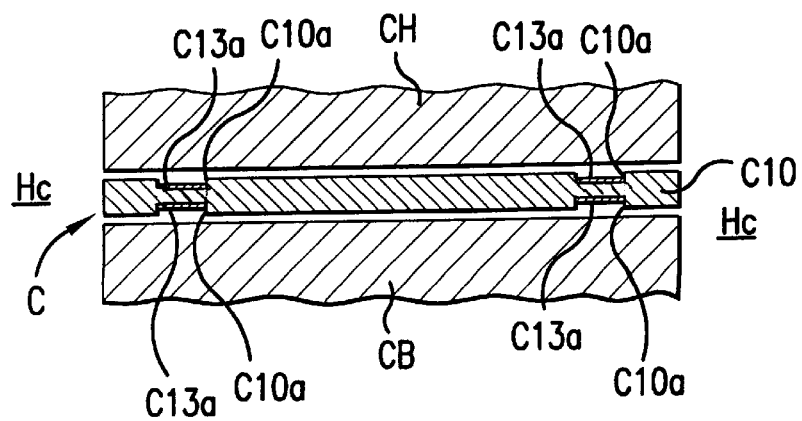
FIG. 6 is an enlarged sectional view, similar to FIG. 2, for showing a third embodiment of the invention.
Figure 7:
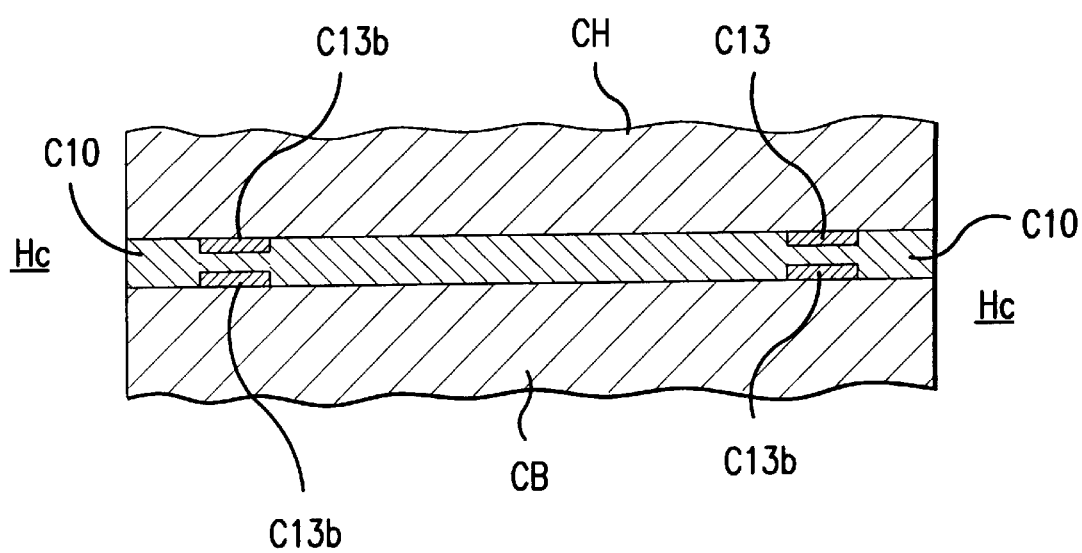
FIG. 7 is an enlarged sectional view, similar to FIG. 3, for showing the gasket of the third embodiment after the foamable coating is foamed.

FIGS. 6 and 7 show a third embodiment C of the gasket of the invention. The gasket C includes cylinder bores Hc, water holes Hw, oil holes Ho, bolt holes Hb and so on, as shown in the gasket A, but the gasket C is formed of one metal plate C10. The gasket C includes grooves or depressions C10a around the cylinder bores Hc extending inwardly from upper and lower surfaces thereof, which are formed symmetrically relative to the center of the plate C10. The grooves C10a may be formed by a coining process. Foamable coatings C13a same as the foamable coating A13a are coated in the bottom of the grooves C10a.

The gasket C with the foamable coatings C13a is installed between the cylinder head CH and the cylinder block CB (FIG. 6), and is tightened. Then, the engine is heated to foam the foamable coatings C13a. Thus, the foamable coatings C13a are changed to foamed layers C13b as sealing members C13, as shown in FIG. 7. In the gasket C, since the grooves C10a are formed around the cylinder bores Hc, the shapes and depths of the grooves C10a may be changed as desired. The gasket C operates as in the gasket A.

In the invention, the surface pressure of the foamed layer may be set as desired by selecting the foaming ratio of the foamable coating and the amount of the coating in the grooves.

In the above embodiments, the foamed layers are formed around the cylinder bores. However, the foamed layer may be formed around the water hole, oil hole and so on. Further, the invention need not be limited to the gasket for the engine, and may be used for sealing two members other than the engine parts.

In the invention, the gasket with the foamable coating is installed between the two members. After the gasket with the foamable coating is tightened between the two members, the gasket is heated. Thus, the suitable surface pressure is obtained by foaming the foamable coating. Since the excess tightening pressure is not applied to the foamed layer, the foamed layer can keep the suitable surface pressure for a long time. Also, since the foamable coating foams according to the shape to be sealed, the sealing ability is improved.

While the invention has been explained with reference to the specific embodiments of the invention, the explanation is illustrative and the invention is limited only by the appended claims.

What is claimed is:

1. A gasket for sealing between two members, comprising:
   a gasket body for constituting the gasket formed of a metal plate and having at least one hole to be sealed, and a groove as a sealing space formed in the metal plate and completely surrounding the at least one hole without extending a substantial area of the gasket, and
   a heat foamed layer disposed only in the groove as the sealing space, said heat foamed layer providing a surface pressure obtained by foaming a foamable coating disposed in the sealing space when the gasket is heated to foam the foamable coating in the sealing space after the gasket is installed between the two members, said heat foamed layer in the sealing space securely sealing around the at least one hole.

2. A gasket according to claim 1, wherein said heat foamed layer disposed in the sealing space forms a part of an outer surface of the gasket.

3. A method for sealing between two members, comprising:
   preparing a gasket body having at least one hole to be sealed, and a sealing space formed in only a part of the gasket body to be situated near the hole,
   providing a heat foamable coating only in the sealing space,
   installing the gasket with the heat foamable coating between the two members, and
   heating the heat foamable coating on the gasket to foam the heat foamable coating in the sealing space to thereby form a heat foamed layer, said heat foamed layer providing a surface pressure at the sealing space obtained by foaming the heat foamable coating between the two members.

4. A method for sealing according to claim 3, wherein said heat foamed layer disposed in the sealing space forms a part of an outer surface of the gasket to directly contact one of the two members.

5. A method for sealing according to claim 3, further comprising tightening the gasket between the two members when the gasket is installed between the two members and before the heat foamable coating is heated.

6. A method for sealing according to claim 5, wherein said two members are a cylinder head and a cylinder block for constituting an internal combustion engine, said heating being conducted when the engine is actuated.

7. A method for sealing according to claim 6, wherein said gasket includes two holes to be sealed, and flanges formed around the two holes, said sealing space being established on the gasket between the flanges.

8. A method for sealing according to claim 7, wherein said gasket is formed of a metal plate, and said sealing space is a groove formed in the metal plate.

* * * * *

UNITED STATES PATENT AND TRADEMARK OFFICE
CERTIFICATE OF CORRECTION

PATENT NO. : 6,186,506 B1  Page 1 of 1
DATED : February 13, 2001
INVENTOR(S) : Yuichi Kinoshita It is certified that error appears in the above-identified patent and that said Letters Patent is hereby corrected as shown below:

<u>Cover page,</u>
Section (75), change the inventor's name "Yuichi Kionoshita" to -- Yuichi Kinoshita --.

Signed and Sealed this

Seventh Day of August, 2001

*Attest:*

*Attesting Officer*

NICHOLAS P. GODICI
*Acting Director of the United States Patent and Trademark Office*